C. W. NEWCOMBE.
GREASE PLUG.
APPLICATION FILED DEC. 20, 1915.
1,187,922.
Patented June 20, 1916.
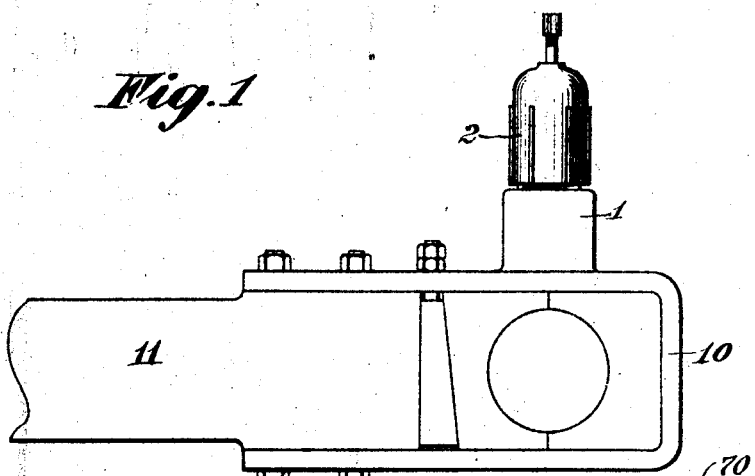
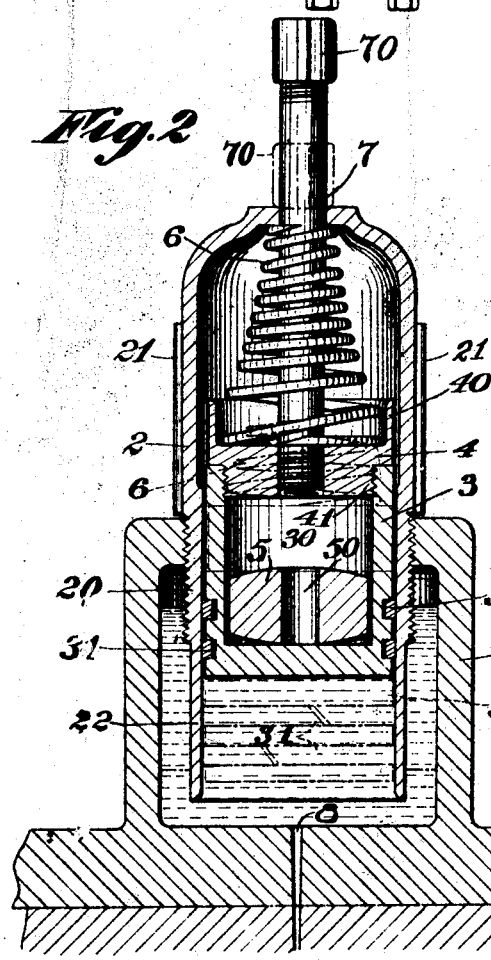
Inventor
Charles W. Newcombe
By Reynolds & Sproll
Attorneys.

UNITED STATES PATENT OFFICE.

CHARLES W. NEWCOMBE, OF TACOMA, WASHINGTON.

GREASE-PLUG.

1,187,922.   Specification of Letters Patent.   Patented June 20, 1916.

Application filed December 20, 1915. Serial No. 67,933.

*To all whom it may concern:*

Be it known that I, CHARLES W. NEWCOMBE, a citizen of the United States, and resident of Tacoma, in the county of Pierce and State of Washington, have invented certain new and useful Improvements in Grease-Plugs, of which the following is a specification.

My invention relates to grease plugs, and comprises certain novel constructions and combinations, which will be hereinafter described and particularly pointed out in the claims.

The object of my invention is to provide a plug which contains within itself means whereby the continuous moderate feeding of the grease may be insured without wastage and without necessity for personal attention.

In the accompanying drawings I have shown my invention embodied in a form of construction which is now preferred by me. I am, however, aware that the principles of my invention, which I believe to be new, may be embodied in constructions which differ quite materially from those shown.

Figure 1 is a side view of a connecting rod carrying one of my grease plugs. Fig. 2 is a longitudinal section of a grease plug mounted in a grease cup, and Fig. 3 a modified construction.

As grease plugs are more commonly used, they consist merely of a plug which screws into a grease cup, and the feeding of the grease to the bearing is secured by an occasional screwing down of the plug. There have been grease cups provided containing means for securing an automatic feeding of the grease. Some of these provide means for automatic and constant feeding of the grease by actuating a feeding piston through the slight movement of a member by rotating it, and thereby screwing it down. Others have employed a loose weight, which by constant tapping upon a feed piston produces the feeding movement.

In my present invention I embody the entire feeding mechanism in a plug, which plug is screwed into a feed cup, after which no further attention is necessary until the grease has all been fed out of the cup. My grease plug is intended for mounting upon bearings, such as crank pin bearings, which have a rotary movement. To secure the feeding movement I employ a loose weight, which is affected by the rotation of the bearings to be thereby given a reciprocating movement, which advances a piston upon the grease to secure its feeding action.

In the construction herein shown, the cup 1 is shown as formed integral with the strap 10 of the connecting rod 11. The cup 1 might, however, be made independent of the strap and secured thereto by any suitable means. The particular construction of the cup is not the essential part of my invention. The plug 2 is hollow, constituting only a shell. This has a threaded exterior section 20 adapted to engage with the threaded opening in the cup. The outer portion of the plug may be provided with the longitudinal ribs 21 for secure engagement by the hand when screwing the plug into and out of place. The exterior shape of the outer part of the plug may be made anything found suitable and desired. At its inner end the plug has a section 22 which is reduced in size sufficient to permit its free passage through the threaded opening of the cup.

A section of the interior surface of the plug extending well inward from its inner ends, is finished so as to constitute a piston-receiving cylinder; within this is a piston 3, which has a stem 7 extending through the outer end of the plug, and provided with a head or button 70 to limit the movement of the piston toward the open or inner end of the plug.

The piston is bored from its outer end to form a chamber in which is placed a weight 5, which weight is free to move axially of the piston. The weight shown in the drawings has a central hole 50. The purpose of this hole is merely to provide a free liberal passage for the air from one side of the weight to the other as it reciprocates. Such passage may be otherwise provided in the weight or in the walls of the piston. The upper or open end of the piston is closed by a plug 4, which has a neck 41 screwing into the mouth of the piston. The chamber in the piston which contains the weight 5 is thus tightly closed, whereby it is impossible for the grease to enter and to have a retarding effect upon the reciprocating weight 5. The piston closing plug 4 may be provided with exterior flange 40, forming a cup for the reception of the coiled spring 6, which spring acts between the piston and outer end of the plug to move the piston toward the open inner end of the plug.

In using a device of this kind, the grease cup 1 would be filled with grease to such an extent as experience shows is needed. The plug is then screwed in place. At the time of inserting the plug, the piston would be projected toward the open end of the plug, but would not extend outside of the plug, being stopped by the button 70 upon the stem 7. As the plug is screwed into the cup, it begins to compress the grease. The pressure thereby produced acts, as the plug is further inserted, to force the piston back or into the position shown in full lines in Fig. 2.

The rotary movement given to the bearing with which the plug is associated produces a reciprocating movement in the hammer or weight 5, thereby forcing the piston downward upon the grease with a gentle constant pressure. In consequence of this, the grease is gently forced through the feed channel 8 to the bearing. The weight of the hammer member 5, and the length of its reciprocation, together with the intensity of the centrifugal force produced by the rotation of the bearing, may be so proportioned that the feeding of the grease may be constant, and yet without forcing grease out at the ends of the bearing. In consequence the grease is all used and not wasted. The result is a great economy in the use of the grease. I have found by practical tests under working conditions that the amount of grease required when fed after this manner is but a small percentage of that used where the plug is fed by hand. Further, the feeding is constant during the operation of the engine, and, therefore, the bearings are kept constantly lubricated so as to prevent their heating.

In the construction of Fig. 3 the two parts of the piston are not screwed together, but are drawn together by a bolt 8, which passes through the central hole in the hammer 5. The nut may be locked by any of the expedients used for this purpose, as for instance, riveting the end of the bolt. To insure against leakage the joint at 34 may have its surfaces slightly coned and washers 38, of copper or other packing material may be placed under head and nut of the bolt. I have also shown the outer casing 2 as provided with a shoulder 23 which acts as a stop to limit the upward movement of the piston.

What I claim as my invention, and desire to patent is:

1. A grease plug bored from its inner end to form a cylinder, a piston fitting said cylinder and bored from its outer end, a plug closing the bore of the piston and a weight within the cavity of the piston adapted to reciprocate axially of the piston.

2. A grease plug bored from its inner end to form a cylinder, a piston fitting said cylinder and bored from its outer end, a plug closing the bore of the piston, a weight within the cavity of the piston adapted to reciprocate axially of the piston, and a spring acting between the outer ends of the piston and the plug to advance the piston.

3. A grease plug bored from its inner end to form a cylinder therein, a piston fitting said bore, an axially reciprocable hammer acting upon the piston to move it, and means for maintaining a uniform stroke of the hammer at all positions of the piston.

4. A grease plug bored from its inner end to form a cylinder of uniform bore, a piston fitting said bore and having a closed interior cavity, and a hammer within said piston cavity and reciprocable axially therein.

5. A grease plug bored to form a cylinder opening freely at its inner end, a piston fitting said cylinder and having a stem extending through the outer end of the plug, a hammer reciprocable axially of and acting upon the piston, and means for maintaining a uniform stroke of said hammer at all positions of the piston.

6. A tubular grease plug, a piston fitting the inner end of the plug and having a stem projecting from its outer end, said piston having a closed interior cavity and a weight loose in said cavity, a spring within the outer end of the plug acting to project the piston, and a stop on the piston stem limiting the projection of the piston.

Signed at Seattle, Washington, this 9th day of December, 1915.

CHARLES W. NEWCOMBE.